May 31, 1960 J. E. WALKER, JR 2,938,679
HELICOPTER
Filed May 19, 1955 2 Sheets-Sheet 1

JAMES E. WALKER, JR.
INVENTOR.

BY *Herbert J. Brown*

ATTORNEY

May 31, 1960    J. E. WALKER, JR    2,938,679
HELICOPTER
Filed May 19, 1955    2 Sheets-Sheet 2
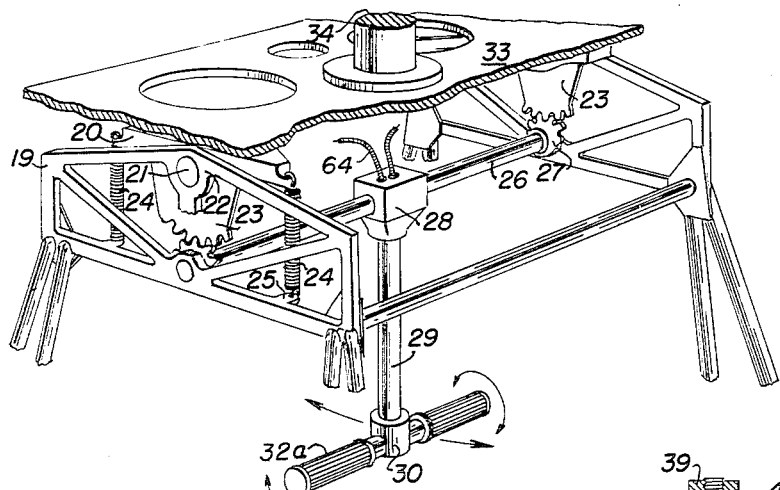
FIG. 3.
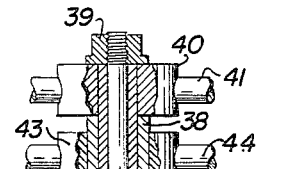
FIG. 4.
FIG. 5.
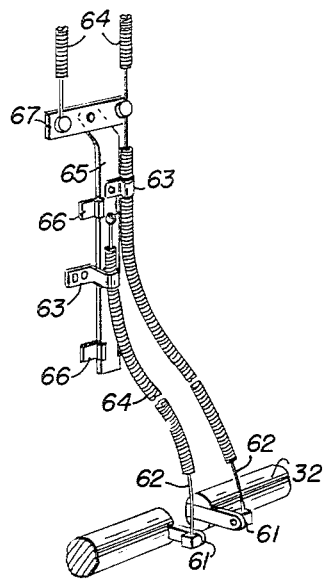
FIG. 6.
JAMES E. WALKER, JR.
INVENTOR.
BY *Herbert J. Brown*
ATTORNEY United States Patent Office 2,938,679
Patented May 31, 1960

2,938,679

HELICOPTER

James E. Walker, Jr., Fort Worth, Tex., assignor of one-third to Tommy E. Walker, Hurst, Tex.

Filed May 19, 1955, Ser. No. 509,526

3 Claims. (Cl. 244—17.23)

This invention relates to helicopters and has reference to a coaxial rotor construction therefor embodying new and useful means of power transmission and flight control.

The advantages of counter rotation coaxial rotors for helicopters have long been apparent; torque equalization over the center of gravity lends stability to flight control characteristics and a consequent reduction in required rotor diameter minimizes the landing area and storage space needed for a craft so equipped. While several means of powering and controlling helicopters provided with counter rotating coaxial rotors have been known and demonstrated in the prior art, such means have not been entirely satisfactory. Intricate and often cumbersome power transmission means have been used heretofore to drive coaxial rotors in opposite directions from a single source of power. Control of such helicopters has been dependent upon altering the relative torque developed by the two rotors through changing their pitch relative to one another; this, in turn, has entailed a mechanism to control the pitch of each rotor through the various phases of its rotation. Another method of control has utilized a third rotor rearwardly disposed in a vertical plane of rotation controlling the orientation of the craft. This method has involved control mechanisms with the additional problem of powering the third rotor. Still another method of control has relied upon the varying of the relative speeds of the two rotors; when used with a single source of power this system further complicates control mechanism and makes more cumbersome the means of power transmission.

An important object of the invention is to provide a simple and economical construction for helicopters utilizing counter rotating coaxial rotors.

A further object of the invention is to provide a construction for helicopters of the counter rotating coaxial rotor type wherein power transmission to the rotors may be accomplished by simplified and economical means.

Another object of the invention is to provide simple and efficient means selectively powering each coaxial rotor of a helicopter.

A further object of the invention is to provide means for controlling the directional orientation of a helicopter, as defined herein, by varying the speeds of counter rotating coaxial rotors relative to one another.

An additional object of the invention is to provide vertical and horizontal control means for a helicopter without varying the pitch of the rotor blades.

Another object of the invention is to provide, for a helicopter of the type described, two independent sources of power, either capable of sustaining flight for safe descent should the other fail.

The invention has, as a further object, the provision of means driving both coaxial rotors of a helicopter from either of two sources of power should the failure of the other source of power so require.

A further object of the invention is to provide means of horizontal control for a helicopter wherein coaxial rotors may be simultaneously inclined forward or rearward relative to the fuselage of the helicopter.

A further object of the invention is to provide, in a helicopter of the type described, means regulating the power sources both collectively and independently to control the collective lift and relative torque effects of the rotors.

An additional object is to provide means wherein a helicopter may be controlled in its forward and rearward motion by natural and instinctive operations of the pilot.

These and other objects will become apparent from the following description and accompanying drawings, wherein:

Figure 3 is a perspective view of the control stick, bearing frame, and mounting plate of a helicopter of the type described illustrating their construction and functional aspects.

Figure 4 is a broken vertical sectional view of the safety clutch, rotor hubs, and power transmission components of a helicopter as defined herein.

Figure 5 is a broken sectional view of the control stick functionally illustrated in Figure 3.

Figure 6 is a fragmentary perspective view of the throttle control mechanism for a helicopter of the type described.

Figure 1:
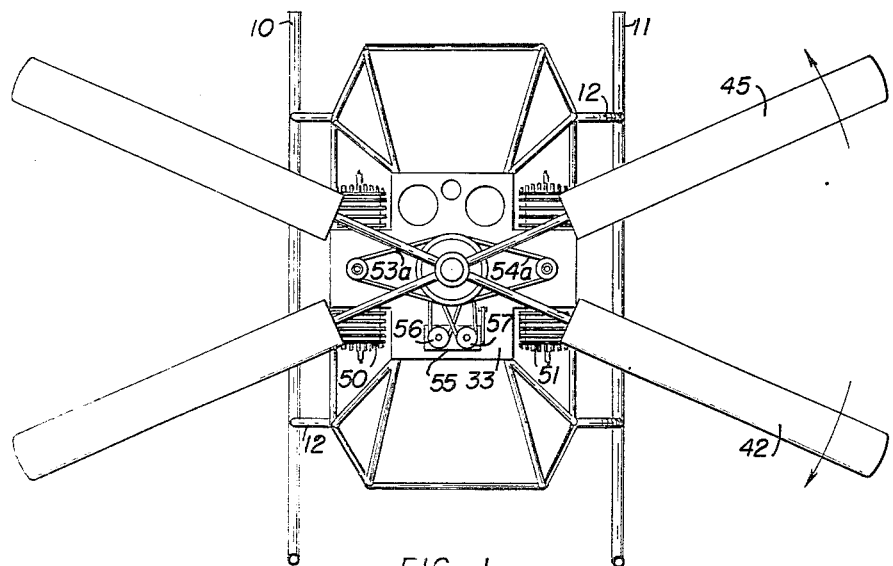
Figure 1 is a plan view of a helicopter as defined herein.
Figure 2:
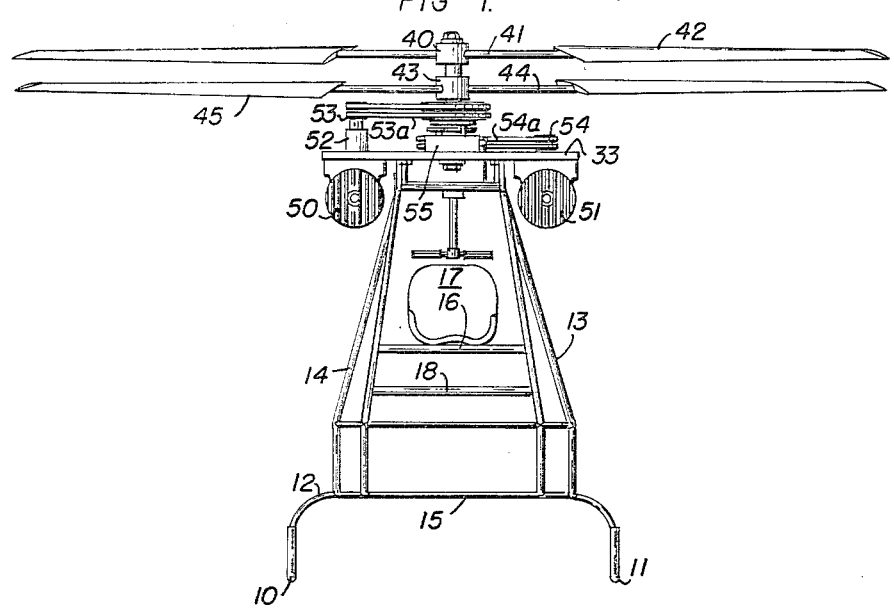
Figure 2 is a front elevation of the same.

From the drawings it will be noted that parallel transverse supports 10 and 11 rest horizontally upon the ground with their front ends inclined upward. Two struts 12 fabricated from similar stock are affixed to each support 10 and 11 at points approximately halfway between the center and the ends of the supports 10 and 11 with said struts extending arcuately upward and inward therefrom. A skelital fuselage 13 is positioned above and between the supports 10 and 11 and is attached at its base to the upper ends of the struts 12 whereby it is supported; the fuselage 13 is formed substantially in the shape of a truncated pyramid and is constructed of lightweight tubular supporting and reinforcing members 14 and 15. Horizontal seat supporting members 16 are attached at their ends to the fuselage 13 and mounted thereon is a forward facing pilot's seat 17 of conventional construction. Within the fuselage 13, beneath and forward of the pilot's seat 17, is a horizontal foot rest 18 formed from lightweight tubular stock attached at each end to the fuselage 13. Bearing frames 19, the upper ends of which are in substantially the shape of isosceles triangles, are attached at the extremities of their bases to upper corners of the fuselage 13 so that they extend parallel to one another at each side of the top of the fuselage 13 with their apexes projecting vertically upward. Between the bearing frames 19 and positioned respectively adjacent thereto are two plate supporting members 20 pivotally attached to the bearing frames 19 by horizontal trunnions 21 journaled into bearings 22 directly beneath the apexes of the bearing frames 19. The lower portions of the plate supporting members 20 form arcuate edges concentric with the trunnions 21 and are provided with gear teeth 23. Equalizing springs 24 are attached at corresponding ends to both longitudinal extremities of each plate supporting member 20; the other ends of the equalizing springs 24 are attached to flanges 25 projecting inward from the bases of the bearing frames 19. A control shaft 26 is laterally disposed between the bearing frames 19 and is journaled at each of its ends into bearings provided near the center of the base of each bearing frame 19. Attached at each end of the control shaft 26 and positioned thereon inwardly adjacent to each bearing frame 19 is a gear 27 with teeth positioned to coact with the corresponding teeth 23 on the lower surface of the plate supporting members 20. A box like housing 28 is positioned at the center of the control shaft 26 and is constructed as an integral part of the control shaft 26; projecting downward from the base of the box like housing 28 is a control stick 29 constructed from tube stock. A control housing 30 is attached to the lower end of the control stick 29 and is provided with lateral tubular bearings 31 into which control handles 32 are journaled. Hand grips 32a are fastened to the exterior surfaces of the control handles 32. The space within the tubular control stick 29 communicates with the interiors of the box like housing 28 and the control housing 30.

A normally horizontal mounting plate 33 of rectangular shape rests upon the plate supporting members 20 and is rigidly attached thereto with its forward and rearward ends parallel with the control shaft 26; where structurally permissible, lightening holes, not numbered, are made in the plate 33 to minimize its weight. Projecting perpendicularly upward through the center of the mounting plate 33 is a main shaft 34 constructed with its lower portion somewhat larger in diameter than its upper portion and with a conically formed shoulder inclining upward and inward joining the differing portions of the main shaft 34. Threads are provided on a part of the main shaft which projects a relatively short distance downward through a corresponding opening in the center of the mounting plate 33, and said threads are received in corresponding threads of a nut 35 held adjacently against the under side of the mounting plate 33. An annular thrust bearing 36, with its inner opening corresponding in diameter to the lower portion of the main shaft 34, is positioned about that shaft and rests upon the upper surface of the mounting plate 33. A tubular inner rotor shaft 37 is positioned about the main shaft with its lower end resting on the upper surface of the thrust bearing 36 and is made so that its inner surfaces conform to the adjacent exterior surfaces of the main shaft 34; the outside diameter of the lower portion of the inner rotor shaft 37 is somewhat larger than that of the upper portion, and the junction of the larger and smaller portions of the inner rotor shaft 37 forms a flat shoulder. An outer rotor shaft 38 of tubular shape is positioned about the smaller portion of the inner rotor shaft 37 so that its interior surface is adjacent to the exterior surface of the inner rotor shaft 37; the lower end of the outer rotor shaft 38 rests upon the shoulder of the inner rotor shaft 37. The upper end of the inner rotor shaft 37 terminates at a level lower than the upper end of the main shaft 34, and the upper end of the outer rotor shaft 38 terminates at a level lower than the upper end of the inner rotor shaft 37. A nut 39 is secured by corresponding threads to the upper end of the main shaft 34, and the lower face of said nut 39 is held thereby against the upper end of the inner rotor shaft 37. An upper rotor hub 40 is made in the shape of a disk and is provided with a cylindrical opening coaxial with its arcuate surface, said opening corresponding in length and diameter to that portion of the inner rotor shaft 37 which projects above the upper end of the outer rotor shaft 38; the upper rotor hub 40 is positioned about and attached to the inner rotor shaft 37 between the nut 39 and the upper end of the outer rotor shaft 38. Upper rotor arms 41 project perpendicularly to the main rotor shaft 34 from opposite positions of attachment to the rotor hub 40. Upper rotor blades 42 of conventional airfoil construction are horizontally attached to the rotor arms 41; the rotor blades 42 are oriented so that the leading edges of the rotor blades 42 face in opposite directions. A lower rotor hub 43 made in the shape of a disk is provided with a cylindrical opening coaxial with its arcuate surface and communicating with each of its sides with said opening corresponding in diameter to the exterior diameter of the outer rotor shaft 38, the lower rotor hub 43 is positioned about and attached to the upper portion of the outer rotor shaft 38. Lower rotor arms 44 project perpendicularly to the main shaft 34 from opposite positions of attachment to the lower rotor hub 43. Lower rotor blades 45 of conventional airfoil construction are attached to projecting portions of the lower rotor arms 44; the lower rotor blades 45 are oriented so that their leading edges face in opposite directions and so that those leading edges are oppositely directed with respect to the leading edges of the upper rotor blades 42. An upper driven pulley 46 is coaxially disposed with respect to the main shaft 34 and is positioned about and attached to the outer rotor shaft 38 beneath the lower rotor hub 43. A lower driven pulley 47, coaxially disposed with respect to the main shaft 34, is positioned about the lower portion of the inner rotor shaft 37 and is affixed thereto. Between the driven pulleys 46 and 47 safety pulleys 48 and 49 are disposed coaxially with respect to the main shaft 34 and are fastened respectively to the outer rotor shaft 38 and the inner rotor shaft 37. Engines 50 and 51, preferably of commercially available aircraft type, are mounted beneath the mounting plate 33 and are attached to the under side of said mounting plate with their drive shafts 52 projecting perpendicularly upward through openings provided in the mounting plate 33. The motors 50 and 51 are constructed so that their drive shafts 52 are driven in opposite directions. The shafts 52 of the motors are of unequal length; the shaft of one motor projects upward to a level parallel with the upper driven pulley, and the other shaft projects upward only to the level of the lower driven pulley. Fastened to the end of each drive shaft 52 are driving pulleys 53 and 54 respectively with the planes of rotation of the driven pulleys 46 and 47. In a preferred form of the invention the driving pulleys 53 and 54 are conventional plate separating clutch type pulleys with suitable controls for each extending into the fuselage 13. V-belts 53a and 54a are placed about the upper and lower driving pulleys 53 and 54 connecting them with the driven pulleys 46 and 47 respectively. A clutch 55, of conventional construction and provided with upward projecting counter rotating shafts of unequal length, is fastened to the upper surface of the mounting plate 33 at a position in front of the main shaft 34. Upper and lower clutch pulleys 56 and 57 are attached to the ends of the longer and shorter clutch shafts respectively in the planes of rotation of the upper and lower safety pulleys 48 and 49 to which they are connected by V-belts 58 and 59. A safety lever 60, capable of engaging and disengaging the clutch 55, extends from the clutch 55 through the mounting plate 33 into the fuselage 13.

Within the control housing 30 at the lower end of the control stick 29, control levers 61 project perpendicularly from the inner ends of the control handles 32. Control cables 62 are attached to the projecting ends of the control levers 61. Cable clips 63 are attached to the interior walls of the control housing 30 and are fastened to the lower ends of cable sheathings 64 which conduct the control cables 62 upward through the control stick 29. Within the box like housing a vertical bar 65 is slidably mounted between guide members 66 attached to the interior of the box like housing 28; a horizontal bar 67 is pivotally attached to the upper end of the vertical bar. The upper end of the sheathing 64 of one control cable is held by a cable clip 63 attached to the interior of the box like housing 28; the end of the control cable 62 extending upward therefrom is attached to the vertical bar 65. The upper end of the sheathing of the other control cable 62 is held by a cable clip 63 attached to the vertical bar; the control cable extending upward therefrom is attached to one end of the horizontal bar 67. Additional control cables 62 with clips 63 confining opposite ends of their sheathings 64 are attached to opposite ends of the horizontal bar 67 and are conducted through openings in the upper wall of the box like housing 28 to the throttles of the two engines 50 and 51, respectively, where they are attached.

In operation, the pilot sits in the seat 17 with his feet on the foot rest 18 and with his hands holding the hand grips 32a at the base of the control stick 29. When the invention is on the ground, the main shaft 34 and the control stick 29 are kept in a vertical position by the equalizing springs 24 and the weight of the engines 50 and 51 mounted beneath the mounting plate 33. When the engines 50 and 51 are operating their velocities may be controlled collectively by turning one or the other hand grip controlling the vertical bar 65, and the velocities of the two engines may be regulated relative to one another. The engines 50 and 51 cause the rotors 41 and 44 to be rotated coaxially in opposite directions; as the engines 50 and 51 are accelerated, the lift produced by the airfoil surfaces of the rotor blades 42 and 55 increases and the craft becomes airborne. By accelerating the engines 50 and 51 the invention may be made to rise and by decelerating them the helicopter may be made to descend. The operation of vertical movement is controlled by one hand grip 32a which operates the vertical bar 65 and simultaneously accelerates or decelerates the two engines 50 and 51. By turning the other hand grip 32a the pilot moves the horizontal bar 67 about its pivotal attachment and causes the engines 50 and 51 and thus the rotors 41 and 44 to alter their relative velocities and a relative increase in torque action of the faster rotor transmits a torque reaction to the fuselage which changes its directional orientation. By accelerating rotors 41 and 44 and pushing the control stick 29 forward the pilot causes the plane of rotation of the rotors 41 and 44 to be inclined and the sum of the vector forces of forward lift and gravity may be utilized to propel the invention forward in level flight. By pulling the control stick toward him the pilot may likewise accomplish backward flight. By various combinations of the different controls a multitude of flight maneuvers may be accomplished. Right and left turns are accomplished by increasing and decreasing the speeds of the engines relative to each other.

If, while in flight, one of the engines should fail, both rotors 41 and 44 may be powered by one engine through use of the safety lever 60 which engages the clutch 55 and causes the rotor of the dead engine to be rotated by means of the safety pulleys 48 and 49; the dead engine may be disengaged by operation of the clutch control of its driving pulley 53 or 54. While most directional control is lost during this emergency operation, the power left is adequate to sustain flight and adequate control remains to bring the craft safely to the ground.

The invention is not limited to the exemplary construction herein shown and described, but may be made in various ways within the scope of the appended claims.

What is claimed is:

1. A helicopter comprising, in combination, a vertical frame, a pilot's seat supported within said frame, parallel bearing frames secured on the upper end of said frame, plate supporting members pivotally mounted on said bearing frames and in axial alignment with each other, segment gears on the lower portions of said plate supporting members, a control shaft rotatably supported at each end thereof in said parallel bearing frames, gears on said control shaft coactive with the first said gears, means selectively rotating said control shaft, a mounting member on said plate supporting members, separate engines mounted on said mounting member, counter-rotating rotors perpendicularly mounted on said mounting member, means connecting one said engine with one said rotor, means connecting the other said engine with the other said rotor, and means independently controlling the speed of each said engine.

2. A helicopter as defined in claim 1, and wherein said means selectively rotating said control shaft is a control stick depending therefrom and positioned forwardly of said pilot's seat.

3. A helicopter as defined in claim 1 and including clutch means between said engines with said rotors and arranged to selectively engage one engine with both said rotors.

References Cited in the file of this patent
UNITED STATES PATENTS

| | | |
|---|---|---|
| 1,132,368 | Lorenc | Mar. 16, 1915 |
| 1,672,276 | Nordberg | June 5, 1928 |
| 1,793,933 | Hoffman | Feb. 24, 1931 |
| 2,380,889 | Waseige | July 31, 1945 |

FOREIGN PATENTS

| | | |
|---|---|---|
| 161,240 | Great Britain | Mar. 29, 1921 |